United States Patent
Redberg et al.

(10) Patent No.: US 12,445,428 B2
(45) Date of Patent: Oct. 14, 2025

(54) CRYPTOGRAPHIC PROOFS FOR SEAMLESS SINGLE SIGN-ON (SSO) TO CLOUD SERVICES BASED ON ON-PREMISES AUTHENTICATION

(71) Applicant: Fortinet, Inc., Sunnyvale, CA (US)

(72) Inventors: David Allen Redberg, New York, NY (US); Yannick Dubuc, Anmore (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 18/375,446

(22) Filed: Sep. 29, 2023

(65) Prior Publication Data

US 2025/0112905 A1    Apr. 3, 2025

(51) Int. Cl.
*H04L 9/40*    (2022.01)

(52) U.S. Cl.
CPC ...... *H04L 63/0815* (2013.01); *H04L 63/0236* (2013.01); *H04L 63/101* (2013.01)

(58) Field of Classification Search
CPC ............ H04L 63/0815; H04L 63/0236; H04L 63/101
See application file for complete search history.

(56) References Cited

U.S. PATENT DOCUMENTS

| | | | |
|---|---|---|---|
| 2018/0075231 A1* | 3/2018 | Subramanian | H04L 63/0807 |
| 2018/0268045 A1* | 9/2018 | Orman | H04L 63/101 |
| 2021/0084031 A1* | 3/2021 | Lao | H04L 63/029 |
| 2024/0037322 A1* | 2/2024 | Tsabba | G10L 17/00 |
| 2024/0078295 A1* | 3/2024 | Philippe | H04L 63/102 |
| 2024/0137361 A1* | 4/2024 | Venkatesh | H04L 63/0815 |
| 2024/0348664 A1* | 10/2024 | Mohanram | H04L 63/02 |
| 2024/0396884 A1* | 11/2024 | Lin | H04L 63/0807 |
| 2025/0047656 A1* | 2/2025 | Chen | H04L 63/083 |

* cited by examiner

*Primary Examiner* — Harris C Wang
(74) *Attorney, Agent, or Firm* — Law Office of Dorian Cartwright; Dorian Cartwright

(57) ABSTRACT

A secure connection is established between an IAM server on a data communication network and an on-premises active directory using a zero trust tunnel based on TCP forwarding. An authentication request is received from a gateway device, for the user to access a service provider hosting applications, responsive to a user request for access to the service provider hosting applications. Responsive to recognizing the user of the authentication request being associated with the established SSO session, an assertion is returned to the gateway that the user is authenticated to access the service provider. An authentication request is received from the service provider, for access to a specific application. Responsive to the group information associated with the user, an assertion is returned to the service provider that user is authenticated for use of the specific application.

12 Claims, 5 Drawing Sheets

CRYPTOGRAPHIC PROOFS FOR SEAMLESS SINGLE SIGN-ON (SSO) TO CLOUD SERVICES BASED ON ON-PREMISES AUTHENTICATION

FIELD OF THE INVENTION

The invention relates generally to computer networks, and more specifically, for utilizing user authentication to on-premises active directories of a private network to establish Single Sign-On (SSO) user authentication status for cloud-based applications on the data communication network.

BACKGROUND

Office 365 and other Cloud SaaS has gained immense popularity with organizations, especially in the new hybrid work environment. But businesses are also experiencing huge challenges in migrating to the Office 365 and other cloud Saas when they already have a well-established Active Directory on-premises. These include managing a hybrid directory environment if attempting to migrate computer accounts from Active Directory to Azure Active Directory, maintaining security, satisfying regulatory compliance, and cost optimization.

What is needed is a robust technique for utilizing user authentication to on-premises active directories of a private network to establish SSO user authentication status for cloud-based applications on the data communication network.

SUMMARY

To meet the above-described needs, methods, computer program products, and systems for utilizing user authentication to on-premises active directories to establish single sign-on (SSO) user authentication status for cloud-based applications.

In one embodiment, a domain login status notification is received by an agent on a user device indicating that a user has logged on to an on-premises active directory located on a private network. The status notification includes an identity of the user and an identity of the user device. User attributes including group information for the user from the on-premises active directory. A secure connection has been established to the on-premises active directory using a zero trust tunnel based on TCP forwarding. The group information includes applications authorized for user.

In another embodiment, an SSO session is established for the user based on the authentication status to the on-premises active directory, including authorized applications. An authentication request is received from a gateway device, for the user to access a service provider hosting applications, responsive to a user request for access to the service provider hosting applications. Responsive to recognizing the user of the authentication request being associated with the established SSO session, an assertion is returned to the gateway that the user is authenticated to access the service provider.

In still another embodiment, an authentication request is received from the service provider, for access to a specific application. Responsive to the group information associated with the user, an assertion is returned to the service provider that user is authenticated for use of the specific application.

Advantageously, computer networking is improved with more secure and efficient network traffic. More specifically, users can have a cloud based Identity Provider (IdP) with secure communication to their on-premises AD/LDAP directory. Additionally, desktop SSO to Secure Access Service Edge (SASE) and Zero Trust Network Access (ZTNA) is enabled.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for utilizing user authentication to on-premises active directories to establish SSO user authentication status for cloud-based applications. One of ordinary skill in the art will recognize many alternative embodiments that are not explicitly listed based on the following disclosure.

Figure 2:
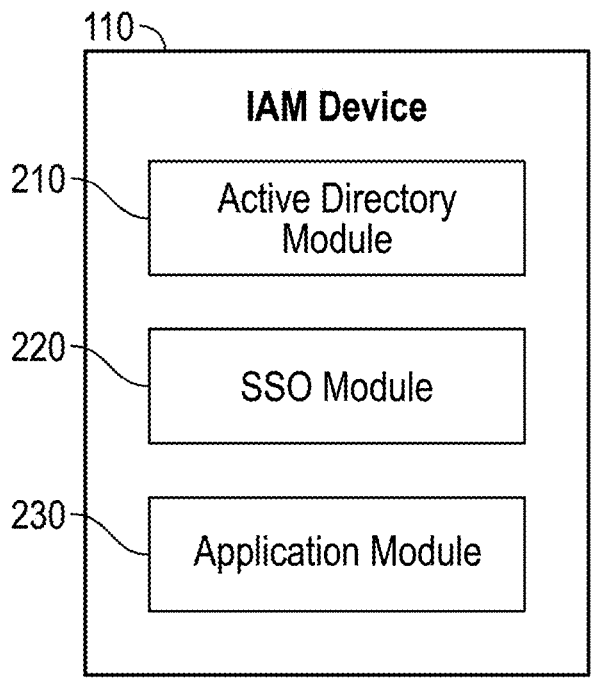
FIG. 2 is a more detailed block diagram illustrating an Identity and Access Management (IAM) server of the system of FIG. 1, according to one embodiment.
Figure 3:
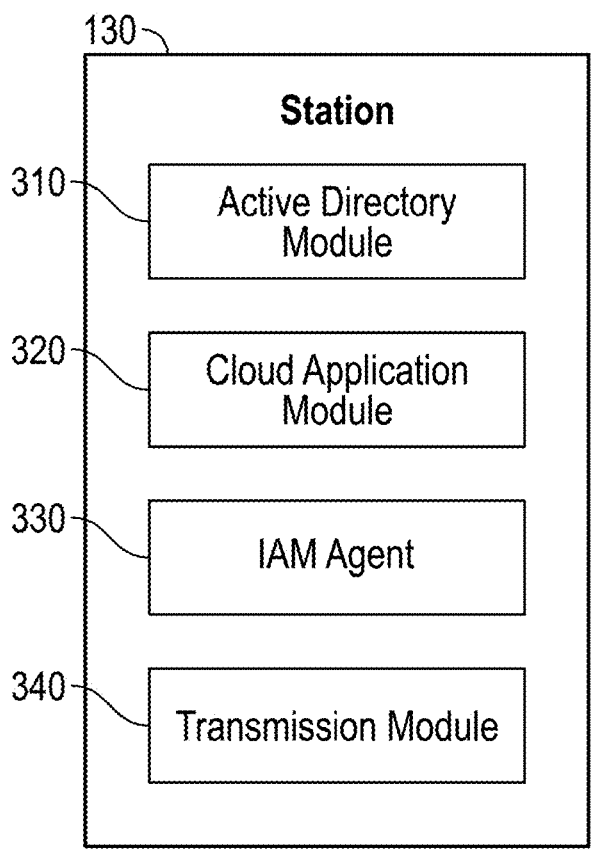
FIG. 3 is a block diagram illustrating a station, according to an embodiment.

I. Network Systems for Cloud App SSO Using Active Directory (FIGS. 1-3)

Figure 1:
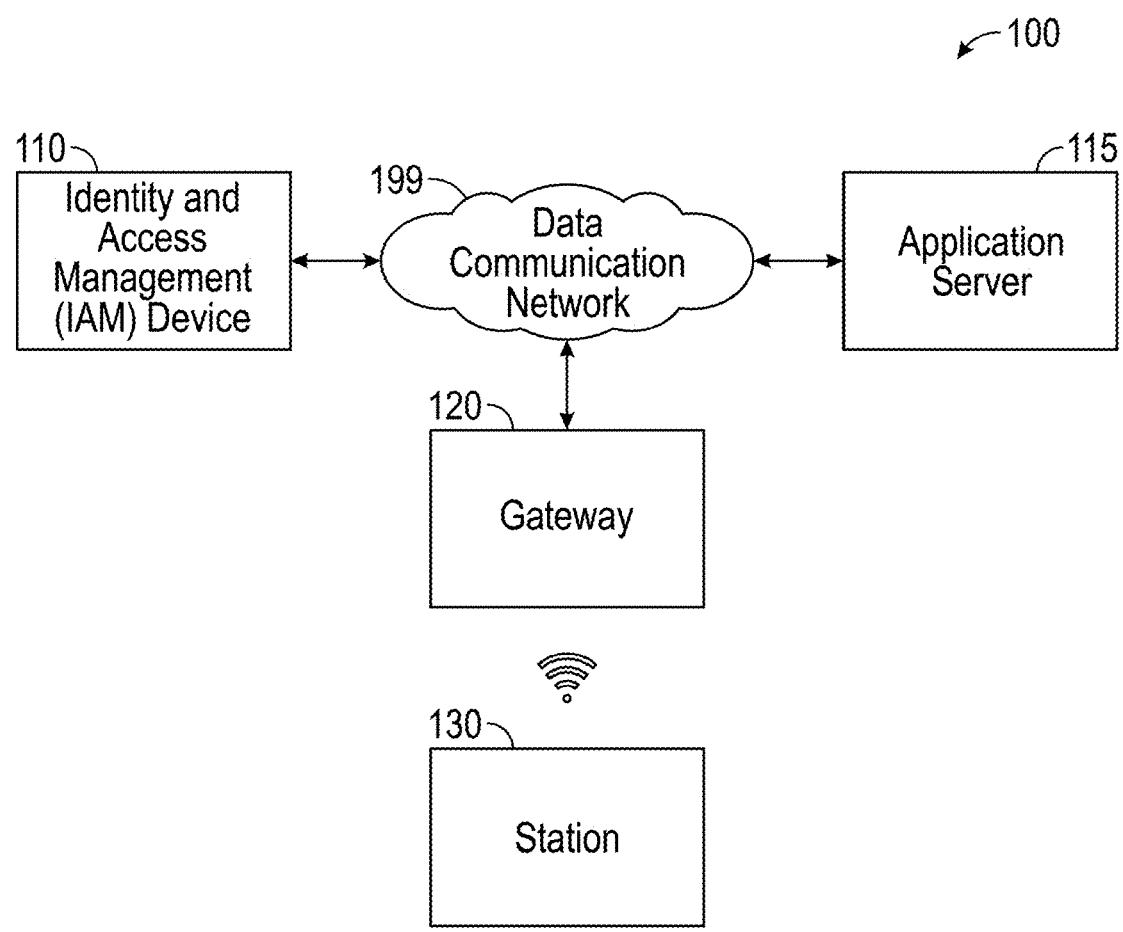
FIG. 1 is a high-level block diagram illustrating a network system for utilizing user authentication to on-premises active directories to establish single sign-on (SSO) user authentication status for cloud-based applications, according to one embodiment.

FIG. 1 is a high-level block diagram illustrating a network system 100 for utilizing user authentication to on-premises active directories to establish SSO user authentication status for cloud-based applications, according to one embodiment. The network system 100 includes an IAM server 110, an application server 115, a gateway 120 and a station 130. Other embodiments of the system 100 can include additional components that are not shown in FIG. 1, such as controllers, network gateways, routers, switches, additional access points, and additional wired or wireless stations. Many variations are possible. The components are implemented in hardware, software, or a combination of both, as shown in the example below of FIG. 6.

The network authentication device 110 can be coupled to a data communication network 199 such as a private network connected to the Internet. The IAM server 110, the application server 115 and the gateway 120 can be connected to the data communication system via hard wire (e.g., Ethernet), in some cases. The station can be connected to the data communication system 199 both via hard wire and via wireless networking, and serve as a bridge for access back and forth. The data communication network 199 can be composed of any data communication network such as an SDWAN, an SDN (Software Defined Network), WAN, a LAN, the Internet, WLAN, a cellular network (e.g., 3G, 4G, 5G or 6G), or a hybrid of different types of networks.

Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPv4 or Ipv6 address spaces.

The IAM server 110 serves an intermediary negotiation SSO access between the active directory of the gateway 120 and the application server 115, as an IdP for SSO. A zero access tunnel to the gateway 120 safely exchanges user and user group information. Another interface satisfies credentialing for the application server 115, or s specific application therein. Different levels of permissions can also be enforced.

The application server 115 hosts one or more cloud-based application, for example, as Saas (Software as a Service). Office 365 is one example of an application server, and it hosts several applications, such as Office, Excel and Power Point. A user or user device can have access to one, a few or all applications. Adobe, Google and others also provide suites of applications. In other embodiments, the application server 115 hosts an independent cloud-based application that is not part of a bigger suite.

The gateway 120 authenticates users on users devices of the private network to active directory. Generally, an active directory, such as Microsoft Active Directory, is a service and executable code, responsible for managing requests and maintaining the database. The active directory can be a Security Assertion Markup Language (SAML) and run on an operating system, such as, Windows 2000, without limitation. Authentication credentials for active directory can include a username and a password, biometric input, codes, patterns, and the like. Accounts and systems that use legacy authentication protocols, such as LDAP and RADIUS can continue to be used with the established active directory. A network administrator can add and remove access. When the IAM server 110 needs user information for SSO from the gateway, a zero trust tunnel is initiated and utilized. Generally, a device always have to verify requests in contrast to VPN which can have a single verification. In another embodiment, the gateway 120 hosts a firewall and provides management functions to network devices.

The station 130 includes an operating system that may require credentials for a login portal to the active directory. One embodiment also includes an agent that communicates using APIs with the IAM server 110. A user can open a browser window, a downloaded app, or other mechanisms to utilize online apps.

FIG. 2 is a more detailed block diagram illustrating the IAM server 110 of FIG. 1, according to an embodiment. The Wi-Fi access point 110 includes an active directory module 210, a SSO module 220, and an application module 230. Components can be implemented in software and/or software. Many other variations of components are possible.

The active directory module 210 to receive a domain login status notification by an agent on a user device indicating that a user has logged on to an on-premises active directory located on a private network. The status notification includes an identity of the user and an identity of the user device. The active directory module 210 retrieves, from the on-premises active directory on the private network, user attributes including group information for the user. A secure connection is established to the on-premises active directory using a zero trust tunnel based on TCP forwarding. The group information can include applications authorized for user.

The SSO module 220, in an embodiment, establishes an SSO session for the user based on the authentication status to the on-premises active directory, including authorized applications. The SSO module 220 receives an authentication request, from a gateway device, for the user to access a service provider hosting applications, responsive to a user request for access to the service provider hosting applications. Responsive to recognizing the user of the authentication request being associated with the established SSO session, the SSO module 220 returns an assertion to the gateway that the user is authenticated to access the service provider.

The application module 230 is configured to receive an authentication request, from the service provider, for access to a specific application. Responsive to the group information associated with the user, the application module 230 returns an assertion to the service provider that user is authenticated for use of the specific application.

FIG. 3 is a more detailed block diagram illustrating the station 130 of FIG. 1, according to an embodiment. The station 110 includes an active directory module 310, a SSO module 320, and an application module 330. Components can be implemented in software and/or software. Many other variations of components are possible.

The active directory module 310 to receive a domain login status notification by an agent on a user device indicating that a user has logged on to an on-premises active directory located on a private network. The status notification includes an identity of the user and an identity of the user device. The active directory module 210 retrieves, from the on-premises active directory on the private network, user attributes including group information for the user/A secure connection has been established to the on-premises active directory using a zero trust tunnel based on TCP forwarding. The group information can include applications authorized for user.

The SSO module 320, in an embodiment, establishes an SSO session for the user based on the authentication status to the on-premises active directory, including authorized applications. The SSO module 320 receives an authentication request, from a gateway device, for the user to access a service provider hosting applications, responsive to a user request for access to the service provider hosting applications. Responsive to recognizing the user of the authentication request being associated with the established SSO session, the SSO module 320 returns an assertion to the gateway that the user is authenticated to access the service provider.

The application module 330 is configured to receive an authentication request, from the service provider, for access to a specific application. Responsive to the group information associated with the user, the application module 230 returns an assertion to the service provider that user is authenticated for use of the specific application.

II. Methods for Cloud App SSO Using Active Directory (FIGS. 4-5)

Figure 4:
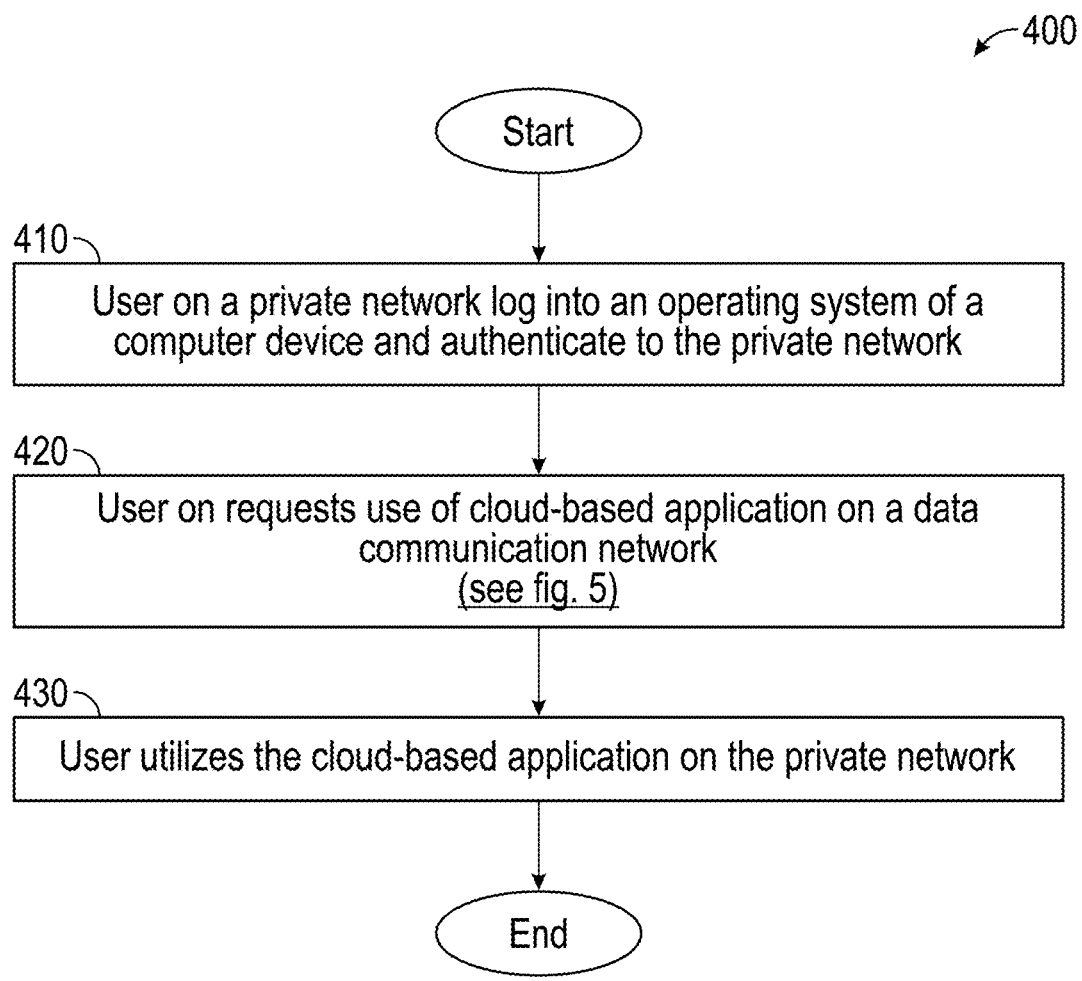
FIG. 4 is a high-level flow chart for utilizing user authentication to on-premises active directories to establish SSO user authentication status for cloud-based applications, according to an embodiment.

FIG. 4 is a high-level flow diagram illustrating a method 400 for logging on to cloud-based applications, according to an embodiment. The method 400 can be implemented by, for example, system 100 of FIG. 1.

At step 410, a user logs into an operating system of a computing device and authenticates to a private network. At step 420, the user requests use of a cloud-based application on a data communication network outside of the private network, using SSO, as further described below in association with FIG. 5. At step 430, the user utilizes the cloud-based application on the private network via the computing device.

Figure 5:
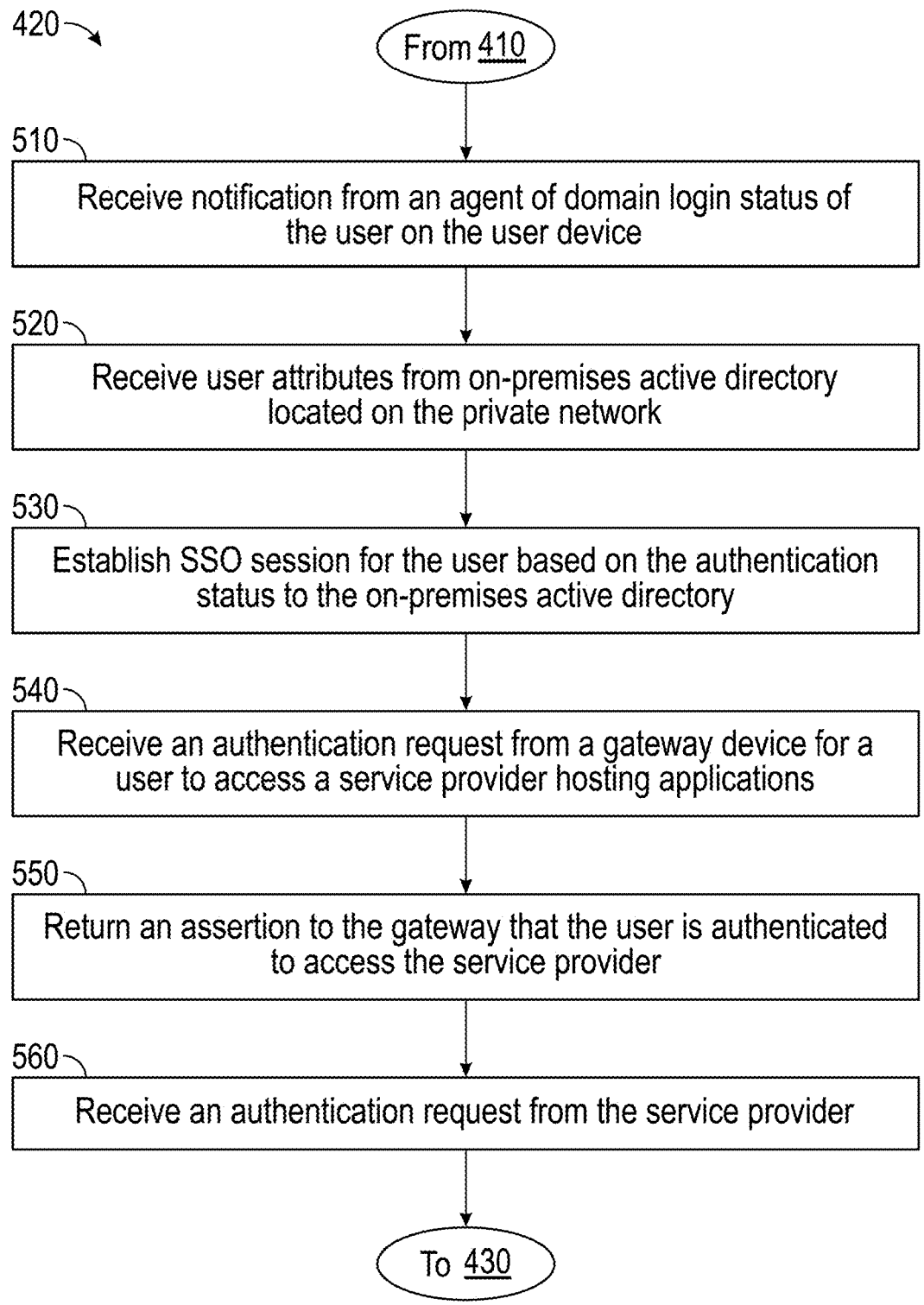
FIG. 5 is a more detailed flow chart for a step for logging on to cloud-based applications, from the method of FIG. 4, according to one embodiment.

Turning to FIG. 5, a more-detailed flow diagram is shown illustrating the step 420 for utilizing user authentication to on-premises active directories on a private network, to establish single sign-on (SSO) user authentication status for cloud-based applications on a data communication network, according to an embodiment.

At step 510, a domain login status notification is received by an agent on a user device indicating that a user has logged on to an on-premises active directory located on a private network. The status notification includes an identity of the user and an identity of the user device.

At 520, user attributes are received from the on-premises active directory including group information for the user. A secure connection has been established to the on-premises active directory using a zero trust tunnel based on TCP forwarding. The conventional techniques uses LDAP which opens active directory to the Internet, and the associated vulnerabilities. The group information concerns applications authorized for user, such as Office 365.

At step 530, an SSO session is established for the user based on the authentication status to the on-premises active directory, including authorized applications.

At step 540, an authentication request (e.g., SAML SSO), is received from a gateway device, for a user to access a service provider hosting applications, responsive to a user request. Responsive to recognizing the user of the authentication request being associated with the established SSO session, at step 550 an assertion is returned to the gateway that the user is authenticated to access the service provider.

At step 560, an authentication request is received from the service provider, for access to a specific application. Responsive to the group information associated with the user, at step 570 an assertion to the service provider is returned that user is authenticated for use of the specific application.

The process then returns to step 430 of method 400.

III. Computing Device for Cloud App SSO Using Active Directory (FIG. 6)

Figure 6:
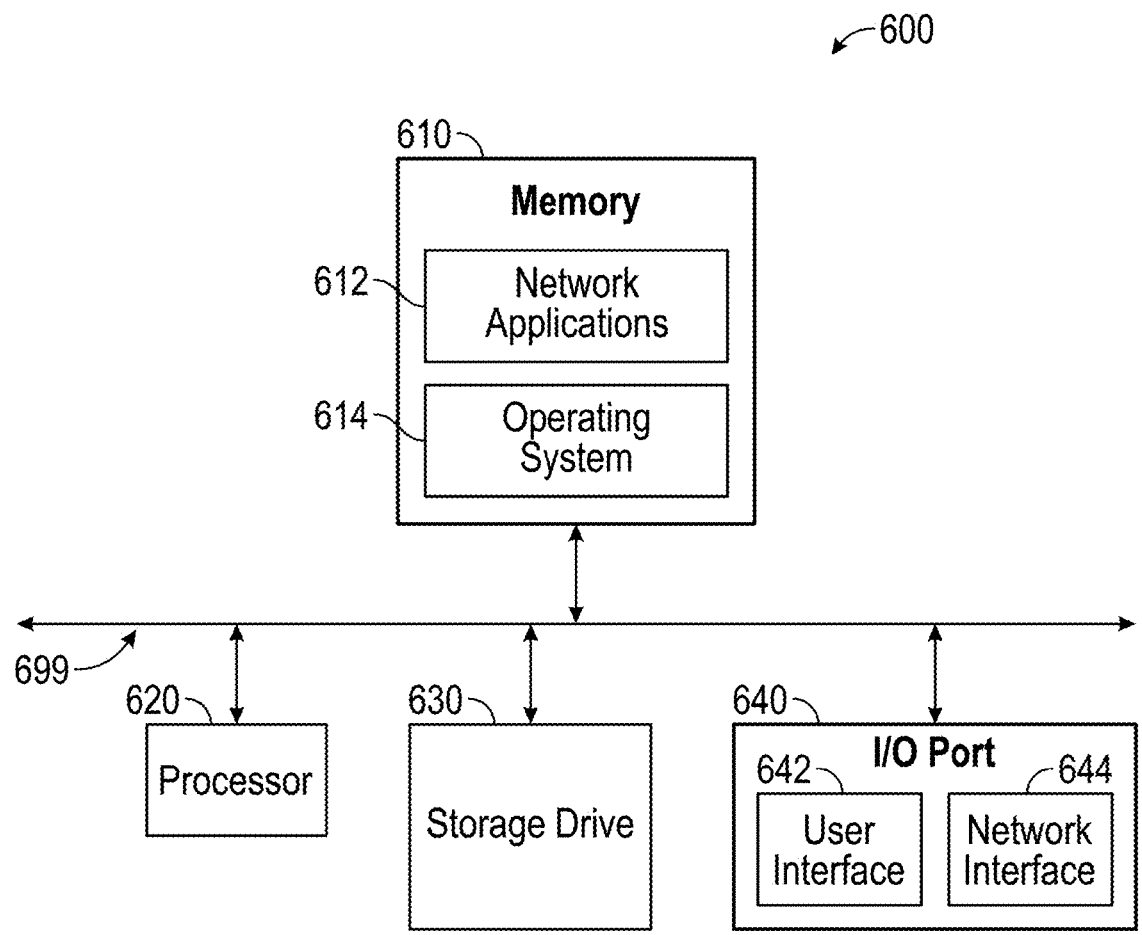
FIG. 6 is a block diagram illustrating an example computing device implementing the network system of FIG. 1, according to one embodiment.

FIG. 6 is a block diagram illustrating a computing device 600 implementing the packet processor 100 of FIG. 1, according to one embodiment. The computing device 600 is a non-limiting example device for implementing each of the components of the system 100, including the IAM server 110, gateway 120, and station 130. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, OR Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICS)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A method in a cloud-based Identity and Access Management (IAM) device coupled to a data communication network, for utilizing user authentication to on-premises active directories of a private network to establish Single Sign-On (SSO) user authentication status for cloud-based applications on the data communication network, the method comprising the steps of:
   receiving a domain login status notification by an agent on a user device indicating that a user has logged on to an on-premises active directory located on a private network, wherein the status notification includes an identify of the user and an identity of the user device;
   retrieving, from the on-premises active directory, user attributes including group information for the user, wherein a secure connection has been established to the on-premises active directory using a zero trust tunnel based on TCP forwarding, the group information includes applications authorized for user;
   establishing an SSO session for the user based on the authentication status to the on-premises active directory, including authorized applications;
   receiving an authentication request, from a gateway device, for the user to access a service provider hosting applications, responsive to a user request for access to the service provider hosting applications;
   responsive to recognizing the user of the authentication request being associated with the established SSO session, returning an assertion to the gateway that the user is authenticated to access the service provider;
   receiving an authentication request, from the service provider, for access to a specific application; and
   responsive to the group information associated with the user, returning an assertion to the service provider that user is authenticated for use of the specific application.

2. The method of claim 1, wherein the active directory comprises Microsoft Active Directory.

3. The method of claim 1, wherein the cloud-based applications comprise Microsoft Office 365 applications.

4. The method of claim 1, wherein the private network is behind a firewall with respect to the cloud-based applications.

5. A non-transitory computer-readable medium storing computer-readable instructions in a cloud-based identity and access management (IAM) device coupled to a data communication network, for utilizing user authentication to on-premises active directories of a private network to establish Single Sign-On (SSO) user authentication status for cloud-based applications on the data communication network, the method comprising:
   receiving a domain login status notification by an agent on a user device indicating that a user has logged on to an on-premises active directory located on a private network, wherein the status notification includes an identify of the user and an identity of the user device;
   retrieving, from the on-premises active directory, user attributes including group information for the user, wherein a secure connection has been established to the on-premises active directory using a zero trust tunnel based on TCP forwarding, the group information includes applications authorized for user;
   establishing an SSO session for the user based on the authentication status to the on-premises active directory, including authorized applications;
   receiving an authentication request, from a gateway device, for the user to access a service provider hosting applications, responsive to a user request for access to the service provider hosting applications;
   responsive to recognizing the user of the authentication request being associated with the established SSO session, returning an assertion to the gateway that the user is authenticated to access the service provider;
   receiving an authentication request, from the service provider, for access to a specific application; and
   responsive to the group information associated with the user, returning an assertion to the service provider that user is authenticated for use of the specific application.

6. The method of claim 5, wherein the active directory comprises Microsoft Active Directory.

7. The method of claim 5, wherein the cloud-based applications comprise Microsoft Office 365 applications.

8. The method of claim 5, wherein the private network is behind a firewall with respect to the cloud-based applications.

9. A cloud-based identity and access management (IAM) device coupled to a data communication network, for utilizing user authentication to on-premises active directories of a private network to establish Single Sign-On (SSO) user authentication status for cloud-based applications on the data communication network, the IAM server comprising:
 a processor;
 a network communication module, communicatively coupled to the processor and to the data communication network; and
 a memory, communicatively coupled to the processor and storing:
  an active directory module to receive a domain login status notification by an agent on a user device indicating that a user has logged on to an on-premises active directory located on a private network, wherein the status notification includes an identify of the user and an identity of the user device,
  wherein the active directory module retrieves, from the on-premises active directory on the private network, user attributes including group information for the user, wherein a secure connection has been established to the on-premises active directory using a zero trust tunnel based on TCP forwarding, the group information includes applications authorized for user;
  SSO module establishes an SSO session for the user based on the authentication status to the on-premises active directory, including authorized applications,
  wherein the SSO module receives an authentication request, from a gateway device, for the user to access a service provider hosting applications, responsive to a user request for access to the service provider hosting applications,
  wherein responsive to recognizing the user of the authentication request being associated with the established SSO session, the SSO module returns an assertion to the gateway that the user is authenticated to access the service provider; and
  an application module to receive an authentication request, from the service provider, for access to a specific application, and
  wherein responsive to the group information associated with the user, the application module returns an assertion to the service provider that user is authenticated for use of the specific application.

10. The device of claim 9, wherein the active directory comprises Microsoft Active Directory.

11. The device of claim 9, wherein the cloud-based applications comprise Microsoft Office 365 applications.

12. The device of claim 9, wherein the private network is behind a firewall with respect to the cloud-based applications.

* * * * *